(12) United States Patent
Prakash

(10) Patent No.: US 7,961,930 B2
(45) Date of Patent: Jun. 14, 2011

(54) RECURSIVE IMAGE FILTERING

(75) Inventor: Ravinder Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 11/834,860

(22) Filed: Aug. 7, 2007

(65) Prior Publication Data

US 2009/0041331 A1  Feb. 12, 2009

(51) Int. Cl.
*G06K 9/00* (2006.01)
(52) U.S. Cl. ............... 382/139; 382/100; 382/254
(58) Field of Classification Search .......... 382/100, 382/137, 139, 254
See application file for complete search history.

(56) References Cited

U.S. PATENT DOCUMENTS

| | | | |
|---|---|---|---|
| 5,157,740 A | 10/1992 | Klein et al. | |
| 6,111,994 A | 8/2000 | Katayama et al. | |
| 6,381,354 B1 * | 4/2002 | Mennie et al. | 382/135 |
| 6,792,133 B2 | 9/2004 | Ott et al. | |
| 7,200,266 B2 | 4/2007 | Ozer et al. | |
| 7,492,974 B2 * | 2/2009 | Prakash et al. | 382/140 |
| 2005/0219616 A1 | 10/2005 | Furuta et al. | |
| 2005/0281450 A1 * | 12/2005 | Richardson | 382/139 |
| 2006/0256123 A1 | 11/2006 | Miyagi | |
| 2007/0205261 A1 * | 9/2007 | Postnikov et al. | 235/379 |
| 2008/0069427 A1 * | 3/2008 | Liu et al. | 382/137 |

* cited by examiner

*Primary Examiner* — Bhavesh M Mehta
*Assistant Examiner* — Stephen R Koziol
(74) *Attorney, Agent, or Firm* — Douglas Lashmit; Hoffman Warnick LLC

(57) ABSTRACT

A system, method and program product for cleaning a black white image. A system is disclosed that includes a filtering system that applies a filter to the black white image, wherein the filter examines a set of neighboring pixels of each black pixel and determines if a black pixel being examined should be converted to a white pixel; and a recursive application system that causes the filtering system to repeatedly re-filter the black white image until a determination is made that the black white image is sufficiently cleaned.

17 Claims, 2 Drawing Sheets

RECURSIVE IMAGE FILTERING

FIELD OF THE INVENTION

This disclosure relates generally to processing black white images, and more particularly relates to a system and method of cleaning black white images using a recursive filtering technique.

BACKGROUND OF THE INVENTION

The ability to clean up black white images remains an important task for industries such as banking where the use of black white check imaging is common. By cleaning up such images, unwanted background matter can be eliminated, making the document more readable by both humans and machines. Current techniques include optimization of thresholding when converting the image from grayscale to black white, use of a mask filter that surround regions to be cleaned, and morphological image techniques. However, techniques are still sought that can provide high performance with limited computational overhead. Accordingly, a need exists for a more robust method of cleaning black white images.

SUMMARY OF THE INVENTION

The present disclosure relates to a system, method and program product for cleaning black white images by recursively applying a relatively small filter mask to black pixels in the image.

In one embodiment, there is a system for cleaning a black white image, comprising: a filtering system that applies a filter to the black white image, wherein the filter examines a set of neighboring pixels of each black pixel and determines if a black pixel being examined should be converted to a white pixel; and a recursive application system that causes the filtering system to repeatedly re-filter the black white image until a determination is made that the black white image is sufficiently cleaned.

In a second embodiment, there is a computer program product stored on a computer readable medium for cleaning a black white image, comprising: program code configured for applying a filter to the black white image, wherein the filter examines a set of neighboring pixels of each black pixel and determines if a black pixel being examined should be converted to a white pixel; program code for causing the filtering system to repeatedly re-filter the black white image until a determination is made that the black white image is sufficiently cleaned; and program code configured for outputting a cleaned black white image.

In a third embodiment, there is a method for cleaning a black white image, comprising: applying a filter to the black white image, wherein the filter examines a set of neighboring pixels of each black pixel and determines if the black pixel should be converted to a white pixel; storing a count of how many black pixels were converted to white pixels; re-filtering the black white image; comparing a current count of how many black pixels were converted to white pixels with the stored count to determine of if the black white image is sufficiently clean; and outputting a cleaned version of the black white image if sufficiently cleaned, otherwise, re-filter the black white image.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
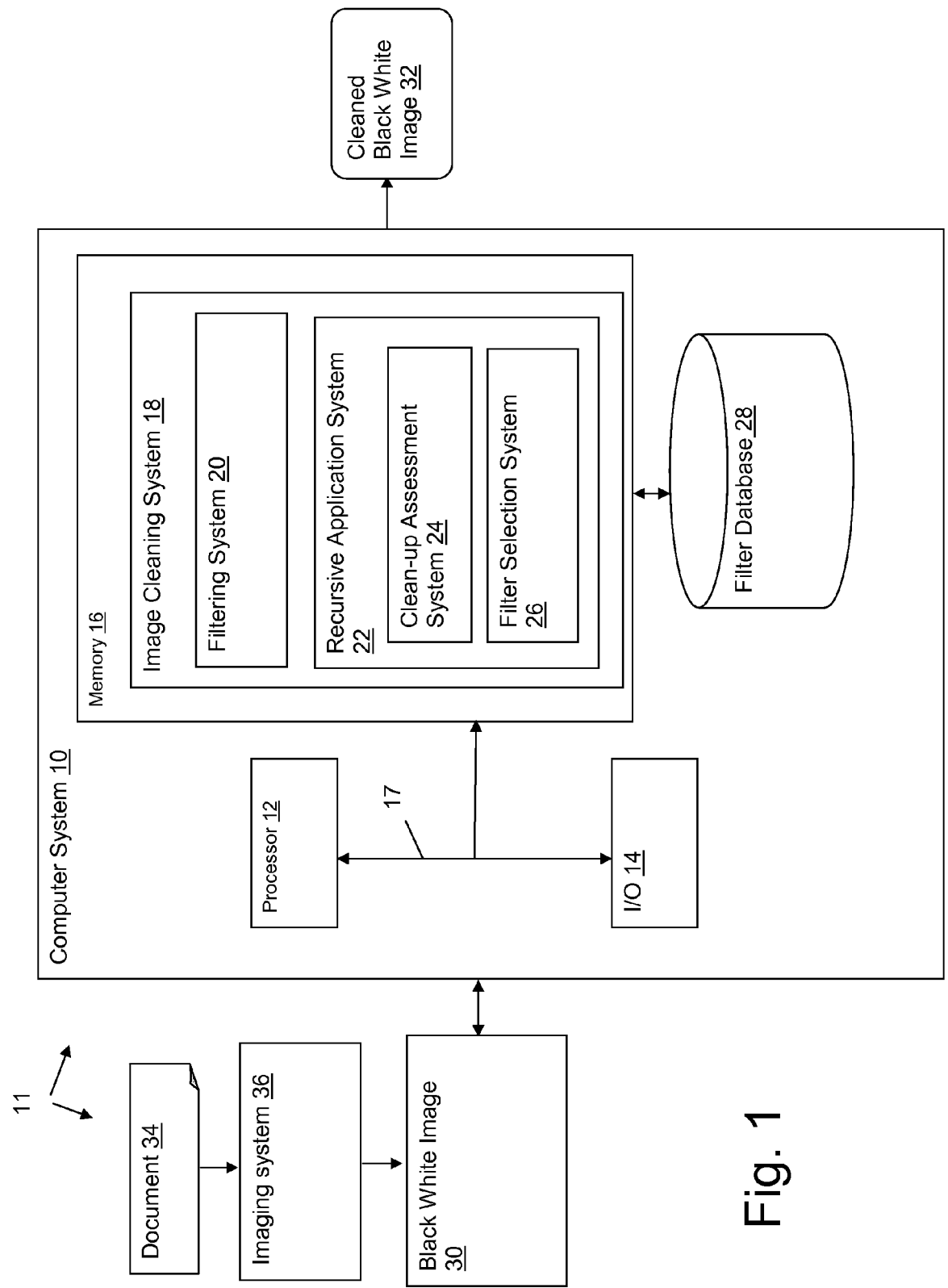
FIG. 1 depicts a computer system having an image cleaning system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring now to the drawings, FIG. 1 depicts a check processing system 11 that includes a computer system 10 having an image cleaning system 18 that processes an inputted black white image 30 and generates a cleaned black white image 32. Black white image 30 may for instance be obtained from an imaging system 36 that imaged a document 34. Image cleaning system 18 could be integrated with the imaging system 36, or be implemented as a separate process. Image cleaning system 18 includes a filtering system 20 that creates a filtered black white image by applying a small mask to each black pixel in the black white image 30. Based on the neighboring pixels defined in the mask, the filter either keeps the pixel black or converts the pixel to white; and a recursive application system 22 that recursively applies the same or different filter to the filtered black white image until the image is adequately clean.

As noted, filtering system 20 utilizes a filter that applies a mask to each black pixel in the black white image 30. In one illustrative embodiment, the filter is implemented using a mask comprising a 3×3 pixel cell block of the form:

| 1 | 2 | 3 |
|---|---|---|
| 4 | A | 5 |
| 6 | 7 | 8 |

As can be seen, the mask comprises a 3×3 pixel cell block made up of a center cell and eight adjacent cells. The center cell A of the 3×3 pixel cell block is mapped onto a black pixel in the black white image 30 and the eight adjacent cells are mapped onto eight adjacent pixel values. The eight adjacent pixel values are then examined to determine if the black pixel should be converted to a white pixel.

Accordingly, for a given black pixel A, a set of neighboring pixels are examined, and a determination is made whether black pixel A should be kept black or converted to white. An 8-bit table having 256 entries can be used by filtering system 20 to implement a filter having a 3×3 mask. The table may be of the form:

| Entry | Input (cells 1-8) | Output (cell A) |
|---|---|---|
| 1. | 0000 0000 | 0 |
| 2. | 0000 0001 | 0 |
| ... | | |
| 256. | 1111 1111 | 1 |

Thus, for this filter, if cells 1-8 surrounding black pixel A were all 0's (indicating white), then cell A would be converted to white. Conversely, if cells 1-8 were all 1's (indicating black), then cell A would remain black. Note that the arrangement of the table, i.e., which inputs result in a conversion, is dependent upon the specific results desired for the filter. As such, the actual implementation of the table can vary and is left to the user to define.

In operation, filtering system 20 applies the filter by sweeping the entire black white image 30, applying the mask to each black pixel. Once all of the black pixels have been processed once, the sweep is complete. It should be understood that other mask arrangements could likewise be utilized to implement a filter without departing from the scope of the invention. For instance, the mask could include additional cells (e.g., pixels surrounding cells 1-8); or just include a subset of cells 1-8, e.g., cells 2, 4, 5, and 7.

Once the sweep is complete, recursive application system 22 decides: (1) if another sweep is warranted; and (2) if so, what filter should be used. Any technique could be used to implement these two functions. In the embodiment shown, clean-up assessment system 24 is utilized to determine if another sweep is warranted. In one illustrative embodiment, clean-up assessment system 24 counts how many pixels were cleaned (i.e., converted to white) in the sweep. This count could then be compared to a count for a previous sweep (or simply compared to some predetermined threshold), and a determination could be made whether the black white image is clean enough or another sweep is warranted. In another embodiment, clean-up assessment system 24 could measure some quality of the image, such as darkness (i.e., the ratio of black to white pixels), to determine if the black white image 30 is adequately clean.

Filter selected system 26 is utilized to select and apply a given filter for each sweep. A filter database 28 may be provided to store different filters. In one illustrative embodiment, filter selection system 26 may utilize a first predetermined filter for a first sweep, a second predetermined filter for a second sweep, a third predetermined filter for a third sweep, etc. In another embodiment, filter selection system 26 may select a filter based on results generated by the clean-up assessment system 24. For example, if very few pixels were converted during a previous sweep, a more aggressive filter could be applied during a next sweep. In still another embodiment, filter selection could be based on some other criteria, such as an amount or change in darkness of the image. In still another embodiment, filter selection system 26 could simply use the same filter for each sweep.

Regardless of the techniques utilized by recursive application system 22, a determination is ultimately made that the image is clean enough, no more sweeps are warranted, and a cleaned black white image 32 is outputted.

Figure 2:
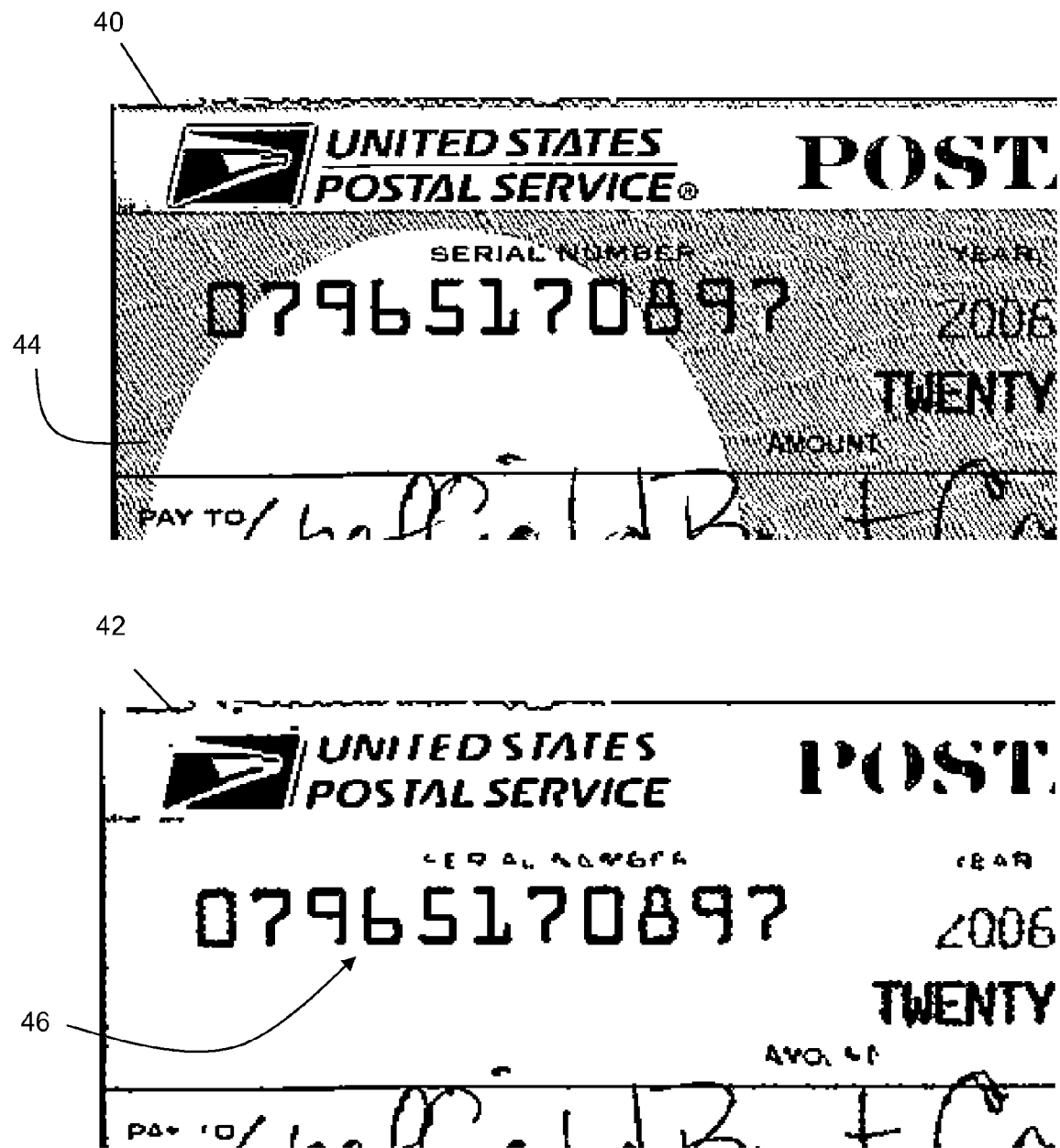
FIG. 2 depicts a document before and after cleaning in accordance with an embodiment of the present invention.

FIG. 2 depicts a portion of a black white image 40, 42 before (top) and after (bottom) cleaning using a 3×3 filter mask as described above. As can be seen, a large diagonal background region 44 has been eliminated, while important information, such as serial number 46, remains intact. Note that the eliminated background region 44 is larger than the filter mask itself, which allows for efficient processing of the image. Another result is that the storage size of the image (after compression) has been greatly reduced, e.g., on the order of five to seven times.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising an image cleaning system 18 could be created, maintained and/or deployed by a service provider that offers the functions described herein for customers. That is, a service provider could offer to deploy or provide the ability to measure darkness as described above.

It is understood that in addition to being implemented as a system and method, the features may be provided as a program product stored on a computer-readable medium, which when executed, enables computer system 10 to provide an image cleaning system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system comprising:
a computer system for cleaning a black white image by performing a method comprising:
applying a filter to an entirety of the black white image, wherein the black white image includes only black and white pixels, and wherein the filter examines a set of neighboring pixels of each black pixel in the black white image and determines if a black pixel being examined should be converted to a white pixel, the applying including, for each black pixel:
generating a look-up value by concatenating pixel values corresponding to a color of each neighboring pixel into a single value;
accessing an entry corresponding to the look-up value in a look-up table for the filter, each entry in the look-up table indicating one of: black or white; and
converting the black pixel to a white pixel and incrementing a count of the number of black pixels converted to white pixels when the accessed entry indicates white; and
repeating the applying to the black white image until a determination is made that the black white image is sufficiently cleaned, wherein the determination is based on the count.

2. The system of claim 1, wherein:
the filter comprises a 3×3 pixel cell block made up of a center cell and eight adjacent cells,
the center cell of the 3×3 pixel cell block is mapped onto a black pixel and the eight adjacent cells are mapped onto eight adjacent pixel values, and
the eight adjacent pixel values are examined to determine if the black pixel should be converted to a white pixel.

3. The system of claim 2, wherein the filter utilizes a look-up table that provides 256 entries for the eight adjacent pixel values.

4. The system of claim 1, wherein the repeating uses a different filter for each successive application, each different filter having a corresponding different look-up table.

5. The system of claim 1, wherein the determination is based on a comparison of the count with a previous count of the number of black pixels converted to white pixels for a previous application.

6. The system of claim 1, wherein the black white image comprises an image of a bank check.

7. A computer program product stored on a non-transitory computer readable medium, which when executed, enables a computer system to implement a method for cleaning a black white image, the method comprising:
applying a filter to an entirety of the black white image, wherein the black white image includes only black and white pixels, and wherein the filter examines a set of neighboring pixels of each black pixel in the black white image and determines if a black pixel being examined should be converted to a white pixel, the applying including, for each black pixel:
generating a look-up value by concatenating pixel values corresponding to a color of each neighboring pixel into a single value;
accessing an entry corresponding to the look-up value in a look-up table for the filter, each entry in the look-up table indicating one of: black or white; and
converting the black pixel to a white pixel and incrementing a count of the number of black pixels converted to white pixels when the accessed entry indicates white;
repeating the applying to the black white image until a determination is made that the black white image is sufficiently cleaned, wherein the determination is based on the count; and
outputting a cleaned black white image.

8. The computer program product of claim 7, wherein:
the filter comprises a 3×3 pixel cell block made up of a center cell and eight adjacent cells,
the center cell of the 3×3 pixel cell block is mapped onto a black pixel and the eight adjacent cells are mapped onto eight adjacent pixel values, and
the eight adjacent pixel values are examined to determine if the black pixel should be converted to a white pixel.

9. The computer program product of claim 8, wherein the filter utilizes a look-up table that provides 256 entries for the eight adjacent pixel values.

10. The computer program product of claim 7, wherein the repeating uses a different filter for successive applications, each different filter having a corresponding different look-up table.

11. The computer program product of claim 7, wherein the black white image is determined to be sufficiently cleaned based on a comparison of the count with a previous count of the number of black pixels converted to white pixels for a previous application.

12. The computer program product of claim 7, wherein the black white image comprises an image of a bank check.

13. A method for cleaning a black white image, comprising:
  applying a filter to an entirety of the black white image, wherein the black white image includes only black and white pixels, and wherein the filter examines a set of neighboring pixels of each black pixel in the black white image and determines if the black pixel being examined should be converted to a white pixel, the applying including, for each black pixel:
    generating a look-up value by concatenating pixel values corresponding to a color of each neighboring pixel into a single value;
    accessing an entry corresponding to the look-up value in a look-up table for the filter, each entry in the look-up table indicating one of: black or white; and
    converting the black pixel to a white pixel and incrementing a count of the number of black pixels converted to white pixels when the accessed entry indicates white;
  storing the count of how many black pixels were converted to white pixels;
  repeating the applying to the black white image;
  comparing a current count of how many black pixels were converted to white pixels with the stored count to determine of if the black white image is sufficiently clean; and
  outputting a cleaned version of the black white image if sufficiently cleaned, otherwise, repeating the applying to the black white image.

14. The method of claim 13, wherein:
  the filter comprises a 3×3 pixel cell block made up of a center cell and eight adjacent cells,
  the center cell of the 3×3 pixel cell block is mapped onto a black pixel and the eight adjacent cells are mapped onto eight adjacent pixel values, and
  the eight adjacent pixel values are examined to determine if the black pixel should be converted to a white pixel.

15. The method of claim 14, wherein the filter utilizes a look-up table that provides 256 entries for the eight adjacent pixel values.

16. The method of claim 13, wherein the repeating uses a different filter for each application, each different filter having a corresponding different look-up table.

17. The method of claim 13, wherein the black white image comprises an image of a bank check.

* * * * *